Aug. 5, 1924.

J. V. N. DORR 1,503,644

SUGAR MANUFACTURE

Filed April 16, 1920    2 Sheets-Sheet 1

Inventor

John V. N. Dorr,

By Pennie, Davis, Marvin & Edmonds

Attorneys

Aug. 5, 1924.
J. V. N. DORR
1,503,644
SUGAR MANUFACTURE
Filed April 16 1920  2 Sheets-Sheet 2
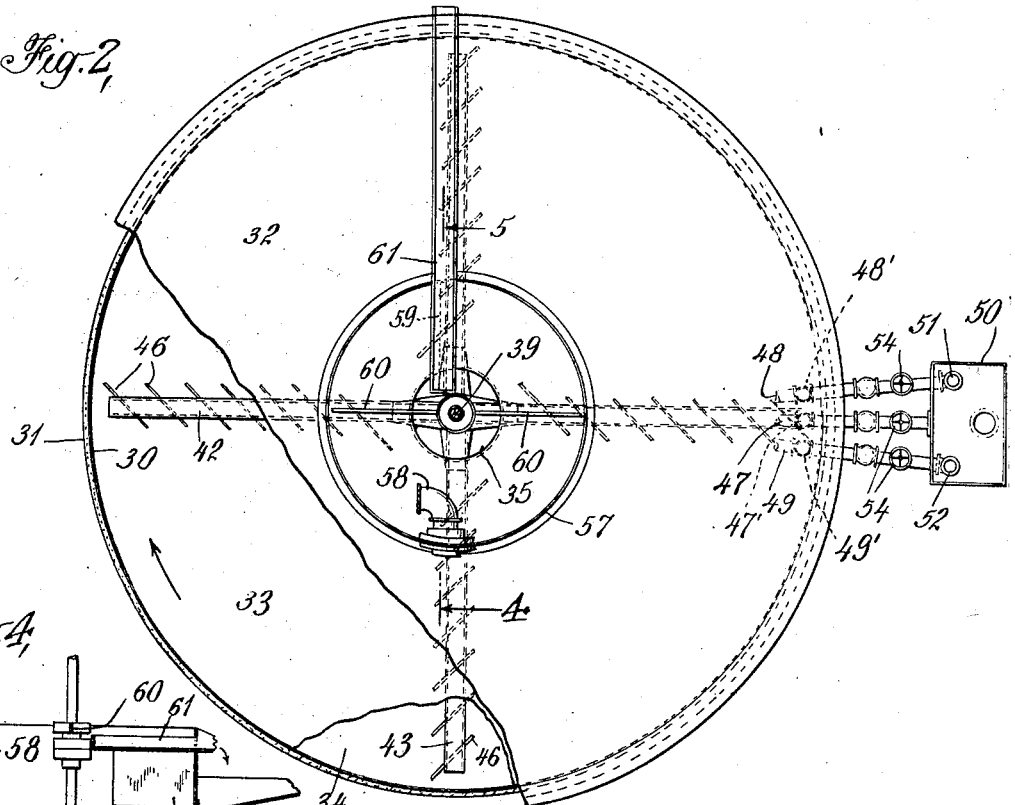
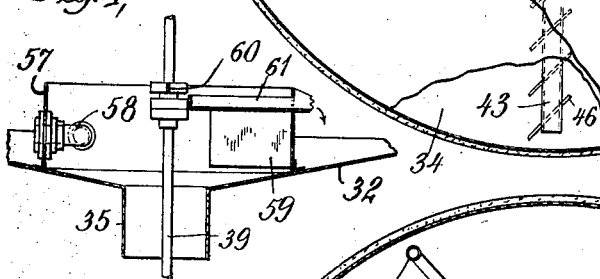
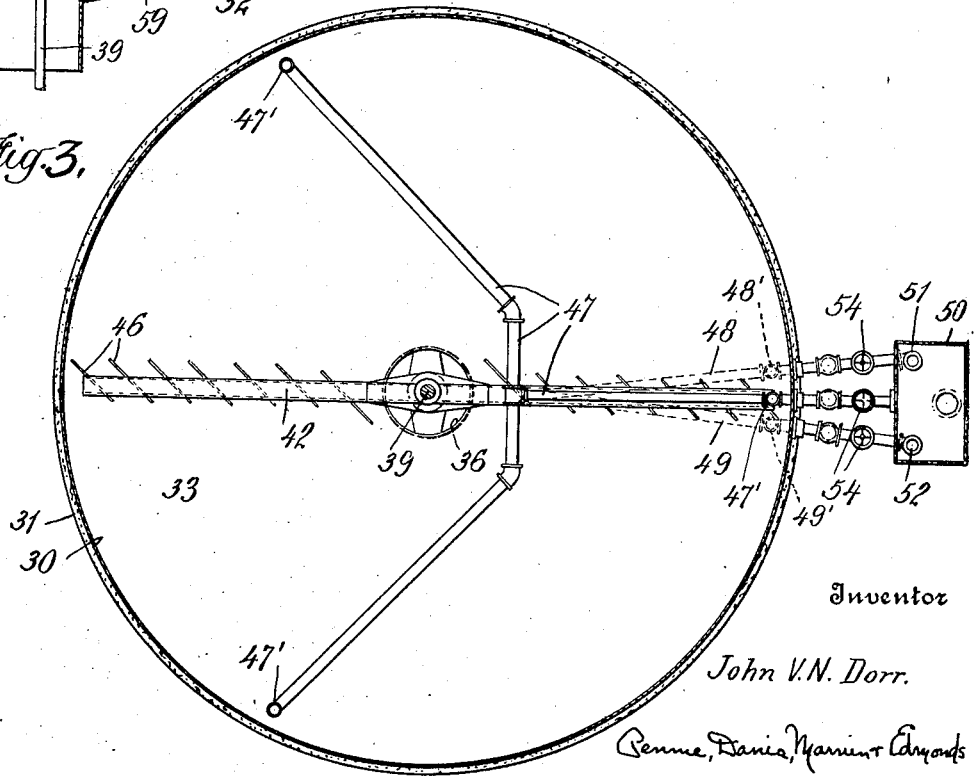
Inventor
John V.N. Dorr.
Penrie, Davis, Marvin + Edmonds
Attorneys Patented Aug. 5, 1924.

1,503,644

UNITED STATES PATENT OFFICE.

JOHN V. N. DORR, OF NEW CANAAN, CONNECTICUT, ASSIGNOR TO THE DORR COMPANY, A CORPORATION OF DELAWARE.

SUGAR MANUFACTURE.

Application filed April 16, 1920. Serial No. 374,312.

*To all whom it may concern:*

Be it known that I, JOHN V. N. DORR, a citizen of the United States, residing at New Canaan, in the county of Fairfield, State of Connecticut, have invented certain new and useful Improvements in Sugar Manufacture; and I do hereby declare the following to be a full, clear, and exact description of the invention, such as will enable others skilled in the art to which it appertains to make and use the same.

This invention relates primarily to sugar manufacture, and more particularly to the manufacture of cane sugar.

The preparation of sugar from sugar cane involves generally four principal operations: (1) extraction of the juice, (2) clarification, (3) evaporation, and (4) separation of the crystals. The sugar cane is first stripped of its leaves in the field and then taken to the mills, where it is crushed and as much as possible of the juice is expressed. As a result of this extracting operation, there is produced a cane sugar juice and a solid residue known in the industry as "bagasse" which is generally used for fuel. The juice is now treated with a quantity of milk of lime sufficient to neutralize the free acidity of the juice and to combine with the albumin and part of the gummy matters. The juice is now ready for defecation or clarification which is ordinarily carried out in two steps. In the first step, the limed juice is pumped through tubular heaters and brought to 212° F. (or above this point in the so-called "superheat" processes). The action of the heat coagulates the albumin and prepares the suspended and coagulated solids for subsequent removal.

Various procedures and instrumentalities have been employed in the second step of the clarifying operation. For example, the heated juice is frequently discharged into open settling tanks for quiescent settling. After a period of time, three layers form, namely, (1) scum, (2) clear liquor, and (3) mud. This process of separation requires a relatively long time and results in consequent sugar losses. Moreover, it involves detailed attention with a resulting high labor cost. In addition, the heat losses by radiation are considerable, while a very large percentage of the total sugar juice goes with the scums and mud and must be subjected to further treatment by quiescent settling, with consequent sugar loss.

It is broadly the object of the present invention to provide improved means for separating the scum, clear liquor and mud which form during the second stage of the clarifying operation. I have attained this object by the use of gravitational separators or thickeners of the tray type which operate continuously.

In the accompanying drawings, I have illustrated a preferred form of gravitational separator or combined sedimentation and decantation apparatus constructed in accordance with the present invention. In this drawing Fig. 1 is a sectional elevation of the improved separator or thickener of the invention;

Fig. 2 is a plan view of the separator with the superstructure removed and portions of the body structure broken away to more clearly illustrate the construction;

Fig. 3 is a section of the separator on the section line 3—3 of Fig. 1; and

Fig. 4 is a sectional detail on the section line 4—4 of Fig. 2.

Figure 1:
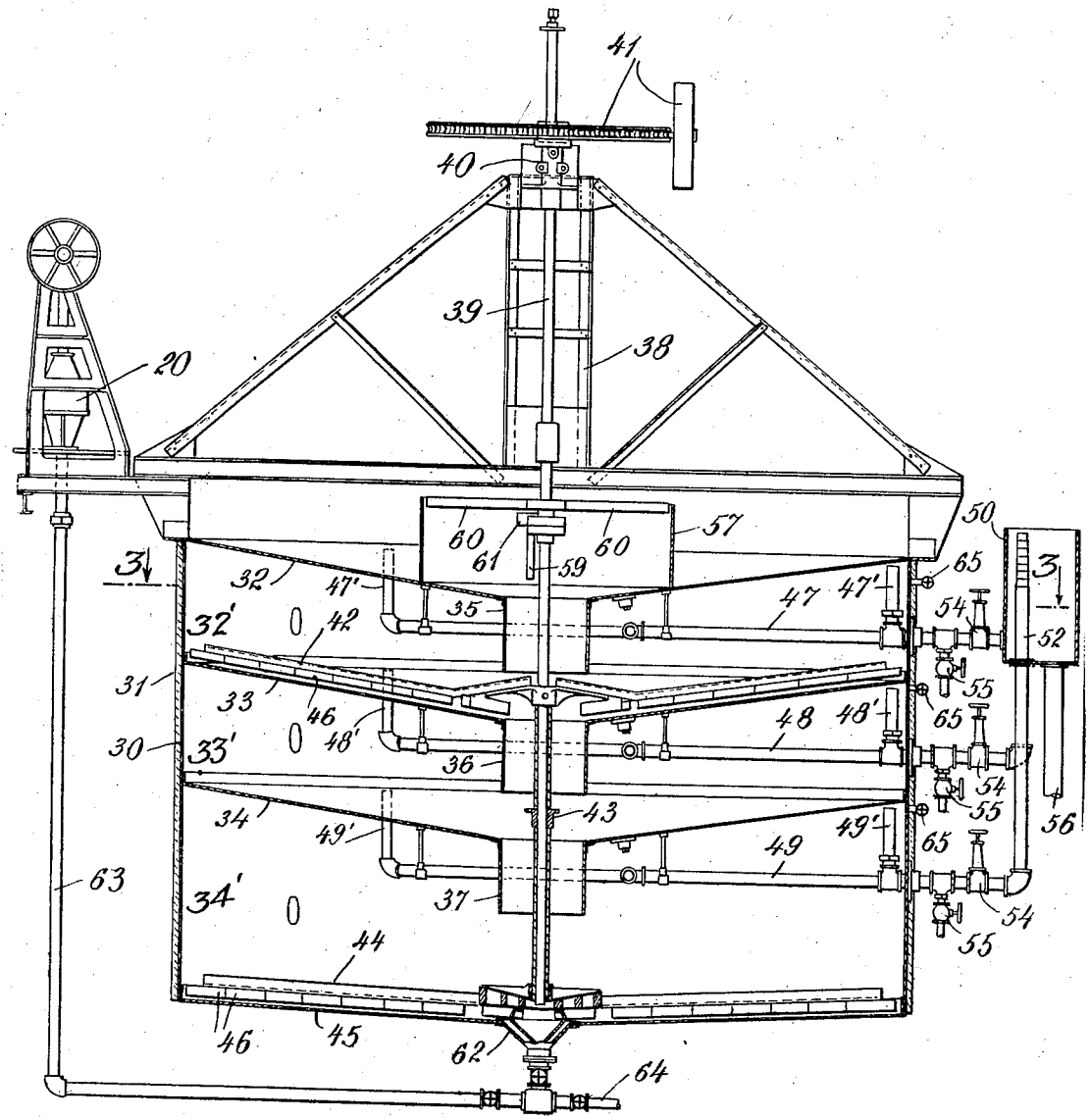

This separator comprises a cylindrical tank 30 having its sides and other exposed parts covered with a layer of heat-insulating material 31. The interior of the tank is divided into a series of superimposed chambers 32', 33' and 34' by means of transverse partitions or trays 32, 33 and 34 which form the respective top walls of these chambers. These trays are secured at their outer periphery to the side wall of the tank 30 and at their centers have an opening from which depends a boot 35, 36 and 37, respectively.

The trays are preferably inclined and slope from the periphery towards the opening at the center thereof. The depending boots 35, 36 and 37 are in alignment and form in effect a solids discharge path common to the three settling chambers within the tank.

Above the tank is operatively mounted a superstructure or frame work 38. A vertically disposed shaft 39 is rotatably carried in appropriate bearings 40 secured to the superstructure, and is arranged to be slowly revolved by a worm gear drive 41. The shaft 39 extends downwardly through the boots 35, 36 and 37. Three pairs of radially disposed arms 42, 43 and 44 are appropriately secured to the shaft 39 and arranged to revolve in proximity to the upper surface of the trays 33 and 34 and the inclined bottom 45 of the tank, respectively. Each of the radially disposed arms carries a series of plows or scrapers 46 which are arranged to move settled solid material from the periphery of the settling chambers towards the central solids discharge outlet.

Clear liquor is withdrawn from the upper part of each of the three settling chambers of the separator by means of decanting pipes 47, 48 and 49. The decanting pipes extend through the side wall of the tank and within the tank are substantially Y-shaped and have vertically positioned decanting connections 47', 48' and 49', respectively. The upper open ends of the decanting connections 47', 48' and 49' are near the top of their respective settling chambers. These decanting connections are moreover arranged near the outer circumference of the settling chambers. The decanting connections are preferably equally spaced about the outer circumferential portion of the settling chambers, and while I have shown only the three decanting connections, more or less may be employed if desired.

The decanting pipes 47, 48 and 49 are arranged to discharge into a sump 50. The decanting pipe 47 communicates directly with this sump near the bottom thereof, while the decanting pipes 48 and 49 communicate with the sump through vertical standpipes 51 and 52, respectively. The upper or outlet ends of the standpipes 51 and 52 are adjustable, and by varying the height of these standpipes the rate of flow of material through the separator can be appropriately adjusted. Outside the tank, the decanting pipes are provided with shut-off cocks 54 and separate outlet cocks 55. The sump 50 has a discharge pipe 56.

The tray 32 forms, in effect, the top of the separator. A cylindrical drum 57, considerably smaller in diameter than the tank 30, is secured above the tray 32 and provides a loading well into which the mixture of sugar juice and solid material is fed through an inlet pipe 58. The discharge opening of the pipe 58 is tangentially arranged with respect to the loading well, so that the mixed juice and solids receive a whirling motion when fed into the well. A transverse baffle 59 is arranged opposite the pipe 58. Near the top of the drum 57 are arranged a pair of skimming arms 60. These arms are secured to and rotate with the shaft 39. A launder or trough 61 is positioned below the plane of the skimmers 60 and serves for the discharge of scum and foam as will be more fully explained hereinafter.

The bottom 45 of the tank is inclined, although its inclination is somewhat less than that of the superposed trays. At its center, the bottom has a discharge cone 62 communicating with a solids discharge pipe 63. The pipe 63 is connected with a diaphragm pump 20. A high pressure supply line 64, of water or air, is connected to the solids discharge outlet of the tank and serves to flush the discharge cone 62 or the pipe 63 in the event that either of these elements become clogged with solid material.

In the operation of the separator illustrated in the drawings, the mixed juice and solids, coming from the heaters, enter the loading well at the top of the separator through the feed pipe 58 in such a way as to receive a whirling motion. Certain of the solids are of less specific gravity than the juice, such for example as air-carrying particles of cellulose, waxes and gums and tend to rise if given time. As a result of this whirling motion the juice moves downwardly at a uniform rate throughout the whole of drum 57, local currents are broken up and the whole of the juice is retained long enough to give the floatable material time to rise and be pushed into the trough 61 by means of the revolving skimmers 60 which rotate with the whirl created by the tangential feed. The boot 35 adds to the effective depth of the loading well. In initially filling the separator, air ports 65 in the side walls of the tank are opened to permit the escape of air displaced by the incoming mixed juice and solids.

Juice and solids pass slowly through the boots 35, 36 and 37, and that portion of the solids not passing directly through these boots to the bottom of the tank settles on the trays 33 and 34 and the bottom 45 and are worked or pushed towards the common solids discharge path by means of the revolving plows or scrapers 46. All solids thus find their way to the discharge cone 62 at the bottom of the separator where they are withdrawn by the action of the diaphragm pump 20 as a heavy mass or sludge with a limited amount of juice.

The provision of a pump or equivalent positive mechanism for withdrawing the accumulated solid material is an important feature in the arrangement. By regulating the quantity of sludge or mud withdrawn by the pump, the rate of flow of the material through the separator can be appropriately adjusted. Thus, in the improved apparatus of the invention, the fermentable mud and solid material settling on the bottoms of the superposed strata are continuously and positively moved to a central discharge opening, and the quantity of sludge or mud removed from the separator in a given time is definitely controlled by means of the diaphragm pump or equivalent device. The clear liquor from which the solids has settled enters the overflow or decanting pipes 47', 48' and 49' and flows to the sump 50 from whence it is discharged through the outlet 56 and passes on through the further stages of the process.

From the foregoing description, it will be observed that the separator of the invention provides a plurality of superposed strata of mixed juice and solids. Thus, in the apparatus specifically illustrated, three strata are provided. In the strata, sedimentation takes place and the settled solids are continuously worked towards the common discharge path by the revolving sludge-collecting mechanism. The clear liquor is withdrawn from each stratum at points very near the periphery of the tank and just below the intersection of the conical trays with the cylindrical side wall of the tank. Relatively heavy solids pass directly through the boots to the discharge cone 62, while suspended solids are distributed throughout each stratum. The superposed strata communicate with one another through the boots, so that the lower strata are fed with mixed juice and solids through these boots. The boots thus serve not only to form the common solids discharge path of the separator but also as feeders of mixed juice and solids for the lower strata.

In the operation of the apparatus of this invention, three products continuously result, one a thickened slime or sludge, (2) a clear sugar juice, and (3) a scum or froth. Fresh sugar juice deteriorates rapidly, resulting in a loss of sugar which is approximately proportional to the length of time the juice is in process. When using this apparatus the separation of the solids from the juice is effected in a relatively short period of time, and only a negligible amount of sugar is lost from deterioration. Moreover, by the process of the invention, only about 5% of the sugar juice passes off with the scums and mud, as compared with 10 to 25% in the heretofore customary practices. The sugar juice in the presence of settleable solids decomposes more readily than does clear juice and it will accordingly be observed that the process of the invention decreases the danger of decomposition of the sugar juice from this standpoint. The average filter press capacity of a sugar manufacturing plant is usually quite closely adapted to routine flow of the plant. The nature of the press cake is such that it cannot be washed in the presses. As a result of the practice of the present invention, the total volume of sludge which must be filter-pressed is very materially reduced, and on this account it is possible, when practicing the invention in existing plants, to increase the volume of sludge discharged from the gravitational separators with hot water ahead of the filter pressers and thereby reduce the sugar losses.

While I have illustrated the trays and bottom of the separator as slightly inclined, I wish it to be understood that these trays may, if desired, be substantially horizontal or flat. The inclined arrangement somewhat facilitates the discharge of the settled solids, but essentially the separator has a flat bottom and the intermediate trays are likewise essentially flat. By this arrangement, the superposed strata of mixed juice and solids are of substantially uniform depth. By this, I mean that the depth of mixed juice and solids in any stratum is substantially uniform throughout. Moreover, the superposed strata may be of a very considerable width or diameter. Thus, for example, the tank 30 may be 18 feet or more in diameter, and with three settling chambers or strata is advantageously about 10 feet high. The bottom settling chamber or strata is preferably somewhat deeper than the upper chambers or strata. Thus, for example, in the separator illustrated in the drawings I have secured good results by making the bottom strata about 4½ feet deep, and each of the upper strata about 2¾ feet deep.

The separation of the scum or froth from the sugar liquor as an individual product is of particular advantage. This scum or froth is composed in large part of fats and waxes, principally the latter, and in the filtering of a liquor containing these fats and waxes, the latter chill on the filter cloth and blind the passages. By the heretofore customary methods of separating solid material from sugar juices, the aforementioned fats and waxes are mixed with the solid material or mud, and impede the filtering operation. By the practice of the present invention, a convenient method is provided for separating the fats and waxes from settleable solids. By weight the latter constitute about 95% of the entire quantity of solid matter in the sugar liquor. In accordance with the present invention the fats and waxes float on the surface of the liquor in the gravitational separator or thickener, in the form of a scum or froth, and are skimmed off and separately withdrawn from the liquor as hereinbefore explained. The withdrawn scum or froth is preferably dehydrated in a separate filter used exclusively for this purpose, and, since the bulk of these materials is relatively small, the question of time is not important. Moreover the separation of the solid matter of the scums from that of the sludge facilitates washing the latter due to the reduction of the relative amount of the waxes and gums in the latter. It moreover offers these gums and waxes in a more concentrated form for recovery by extraction or other process.

I claim:

1. A gravitational separator, comprising a series of superposed settling chambers, a centrally disposed boot depending from the upper wall of each chamber but stopping short of the bottom and communicating with the chamber, said boots forming a solids discharge path common to all of the chambers, means permitting the withdrawal of liquid from a plurality of uniformly spaced points near the top of each chamber, means permitting the discharge from the last chamber of said series of the accumulated solid material from all of said chambers, and a revolving sludge collecting mechanism having a vertically disposed shaft passing through said solids discharge path and provided with a series of radially disposed arms arranged in proximity to the bottoms of the chambers and adapted to move settled solid material across the bottom of each chamber towards said solids discharge path.

2. The combination in an apparatus for manufacturing sugar of a gravitational separator comprising a settling chamber having a loading well near the top thereof, means for tangentially introducing liquor into said loading well and a rotating scum remover mounted above the well and rotating with the swirl set up by the tangential feed.

3. A gravitational separator, comprising a series of superposed settling chambers, a centrally disposed boot depending from the upper wall of each chamber but stopping short of the bottom and communicating with the chamber, said boots forming a solids discharge path common to all of the chambers, means permitting the withdrawal of liquid from near the top of each chamber, means permitting the discharge from the last chamber of said series of the accumulated solid material from all of said chambers, and a revolving sludge collecting mechanism, having arms arranged in proximity to the bottoms of the chambers and adapted to move settled solid material across the bottom of each chamber towards said solids discharge path.

4. A gravitational separator for separating from a liquid solid impurities both heavier and lighter than the liquid, comprising a settling chamber, a loading well superposed thereon and discharging into the chamber, a depending boot extending to a point near the bottom of the chamber and forming a continuation of the well, the depth of the well and boot being sufficient to permit the separation by flotation of the floatable solids, and tangential feed means adapted to produce a swirling motion in the well to assure uniform retention of the feed in the well.

In testimony whereof I affix my signature.

JOHN V. N. DORR.